United States Patent
Böhm et al.

(10) Patent No.: US 9,148,914 B2
(45) Date of Patent: Sep. 29, 2015

(54) CURRENT SOURCE AND METHOD FOR PROVIDING A DRIVING CURRENT

(71) Applicant: ams AG, Unterpremstätten (AT)

(72) Inventors: Michael Böhm, Graz (AT); Peter Trattler, Graz (AT); Mario Manninger, Unterpremstätten (AT)

(73) Assignee: ams AG, Unterpremstaetten (AT)

( * ) Notice: Subject to any disclaimer, the term of this patent is extended or adjusted under 35 U.S.C. 154(b) by 296 days.

(21) Appl. No.: 13/874,351

(22) Filed: Apr. 30, 2013

(65) Prior Publication Data
US 2013/0293140 A1 Nov. 7, 2013

(30) Foreign Application Priority Data
May 2, 2012 (EP) .................................. 12166432

(51) Int. Cl.
*H05B 37/02* (2006.01)
*H05B 33/08* (2006.01)

(52) U.S. Cl.
CPC ........ *H05B 33/0809* (2013.01); *H05B 33/0815* (2013.01); *H05B 33/0827* (2013.01); *Y02B 20/347* (2013.01)

(58) Field of Classification Search
CPC ................... G09G 2320/064; H05B 33/0806; H05B 33/0809; H05B 33/0833; H05B 33/0839; H05B 33/0842; H05B 33/0845; Y02B 20/347
USPC .............. 315/291, 302; 326/82; 327/108, 109
See application file for complete search history.

(56) References Cited

U.S. PATENT DOCUMENTS

| 5,671,003 A | 9/1997 | Herczeg et al. |
| 7,145,295 B1 * | 12/2006 | Lee et al. ...................... 315/291 |
| 8,081,146 B2 * | 12/2011 | Wang .............................. 345/82 |
| 8,098,028 B2 | 1/2012 | Trattler |
| 2002/0012008 A1 * | 1/2002 | Takagi .......................... 345/691 |
| 2006/0273236 A1 * | 12/2006 | Gutbrod et al. ............... 250/205 |
| 2007/0229042 A1 * | 10/2007 | Cusinato et al. ............. 323/267 |
| 2009/0079360 A1 | 3/2009 | Shteynberg et al. |

(Continued)

FOREIGN PATENT DOCUMENTS

| DE | 10 2006 032 071 A1 | 1/2008 |
| GB | 2 454 557 A | 5/2009 |

(Continued)

OTHER PUBLICATIONS

"AS3674—Highly Efficient 2-10 LEDs Backlight Driver with 2 PWM Inputs", Datasheet, www.austriamicrosystems.com, rev. 1.1-1, Press Release: Feb. 27, 2012.

*Primary Examiner* — William Hernandez
(74) *Attorney, Agent, or Firm* — McDermott Will & Emery LLP

(57) ABSTRACT

In one embodiment a current source comprises an input (In) for receiving a brightness signal (Sb), and an output (Out) for providing a driving current (Id) for at least one light-emitting diode, LED, wherein the current source (CS) is configured to extract a first and a second current value (idac_high, idac_low) from the brightness signal (Sb), to derive a duty cycle value (Smod) from the brightness signal (Sb) and to modulate the driving current (Id) as a function of the duty cycle value (Smod) in a pulse-width modulation comprising the first and the second current values (idac_high, idac_low). Furthermore, a method for providing a current is described.

12 Claims, 4 Drawing Sheets

(56) References Cited

U.S. PATENT DOCUMENTS

Figure 1:
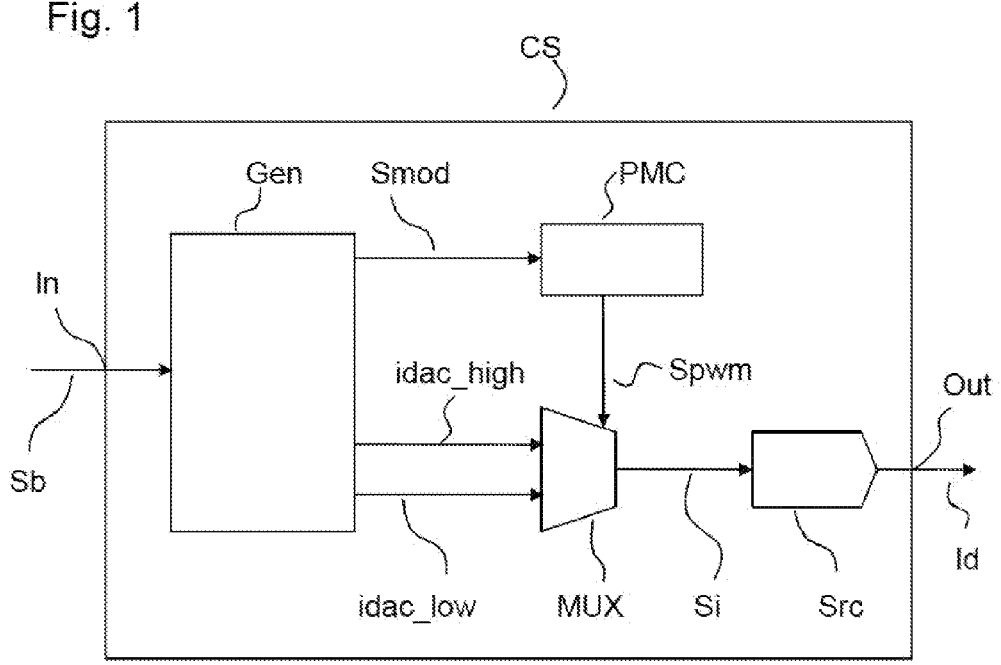

| | | | |
|---|---|---|---|
| 2009/0108768 A1* | 4/2009 | Yang et al. | 315/291 |
| 2009/0303161 A1 | 12/2009 | Messmer et al. | |
| 2010/0213871 A1* | 8/2010 | Chen et al. | 315/295 |
| 2011/0032283 A1* | 2/2011 | Baek | 345/690 |
| 2011/0140621 A1* | 6/2011 | Yi et al. | 315/224 |
| 2011/0199011 A1* | 8/2011 | Nakazawa | 315/193 |
| 2012/0038287 A1* | 2/2012 | Li et al. | 315/250 |
| 2013/0057165 A1* | 3/2013 | Ide et al. | 315/186 |

FOREIGN PATENT DOCUMENTS

| | | |
|---|---|---|
| WO | 01/73818 A1 | 10/2001 |
| WO | 2011/135505 A1 | 11/2011 |

* cited by examiner though they are gaining importance because of their widespread use in backlights of mobile phones with liquid crystal displays, LCDs, current sources which control a luminous intensity of such LEDs are becoming a focal point for optimizing LED backlight.

CURRENT SOURCE AND METHOD FOR PROVIDING A DRIVING CURRENT

The invention refers to the technical field of current sources.

Current sources are used in various applications, for example for driving a light-emitting diode, LED. While LEDs are gaining importance because of their widespread use in backlights of mobile phones with liquid crystal displays, LCDs, current sources which control a luminous intensity of such LEDs are becoming a focal point for optimizing LED backlight.

In a known implementation of such a current source for driving an LED, the intensity of the LED is controlled by means of a pulse-width modulation of the LED current provided by the current source. Thereby, a fixed current which is set by means of, for example, an external bias resistor is switched on and off according to a desired duty cycle with the help of a pulse-width modulated signal. The modulation frequency is high enough to avoid any flickering. The power consumption of the LED is proportional to a product of LED current, LED forward voltage and duty cycle of the pulse-width modulation signal. It can be desirable, especially in mobile phones, to reduce the power consumption of an LED.

It is therefore an objective to provide an enhanced current source for this kind of application.

This objective is achieved by the subject-matter of the independent patent claims. Embodiments and developments of the invention are subject-matter of the dependent claims.

In one embodiment a current source comprises an input for receiving a brightness signal and an output for providing a driving current for at least one light-emitting diode. Thereby, the current source is configured to extract a first and a second current value from the brightness signal, to derive a duty cycle value from the brightness signal and to modulate the driving current as a function of the duty cycle value in a pulse-width modulation comprising the first and the second current values.

The current source extracts the first and the second current values from the brightness signal. At the same time, the duty cycle value is derived from the brightness signal. The driving current is then generated by modulating between the first and the second current value according to the duty cycle value in a pulse-width modulation.

As the driving current for the at least one LED is modulated between the first and the second current value, a reduced LED average current can be achieved by increasing the duty cycle value. This advantageously results in the same brightness of the LED with reduced forward voltage and reduced driving current, consequently with reduced power dissipation.

The duty cycle is also known as "duty factor". It designates the ratio of the duration of an impulse to the duration of the total period of a pulse-width modulated signal.

In another embodiment the brightness signal comprises a digital signal and is configured to control a brightness of the at least one LED.

In a further embodiment the first and second current values are extracted from the brightness signal using a number of most significant bits.

In another embodiment the duty cycle value is derived from the brightness signal using a number of least significant bits. The duty cycle value represents a value of the duty cycle of the driving current.

The brightness signal is split up into two parts, namely the number of most significant bits and the number of least significant bits. The most significant bits are used for determining the first and second current values. The least significant bits are used to generate the duty cycle value.

In another embodiment the brightness signal is divided into segments. For each segment the upper limit represents the first current value and the lower limit represents the second current value, respectively.

This segmentation results in a step function in which a number of possible values of the brightness signal are grouped together in a segment with a fixed value for the first current value and a fixed value for the second current value for the whole segment.

In a further development the first and the second current values each comprise a digital value and the first current value is different from the second current value.

In a further embodiment the first current value is set to a first minimum value above zero. The second current value is set to a second minimum value above zero or zero.

Consequently, the driving current is modulated between two different current values according to a duty cycle determined by the duty cycle value. As the luminous intensity of LEDs tends to vary at very low currents, first and second minimum values are used for first and second current values, respectively, to avoid operation at very low currents.

In another embodiment the current source further comprises a generator circuit, a pulse-width modulation circuit, a multiplexing circuit and a current sourcing circuit. The generator circuit is coupled to the input and comprises outputs to provide the first and second current values and the duty cycle value. The pulse-width modulation, PWM, circuit is coupled to the generator circuit and comprises an output to provide a PWM signal as a function of the duty cycle value. The multiplexing circuit is coupled to the generator circuit and to the PWM circuit and comprises an output to provide a digital current signal as a function of the first and second current values and the PWM signal. The current sourcing unit is coupled to the multiplexing circuit and to the output and is configured to generate the driving current as a function of the digital current signal.

The generator circuit splits up the brightness signal into most significant bits which are used for generating first and second current values and into least significant bits resulting in the duty cycle value. The PWM circuit generates the PWM signal that has a duty cycle corresponding to the duty cycle value. The multiplexing circuit switches between first and second current values using the PWM signal to control the switching. The current sourcing circuit provides the analog driving current in accordance with the digital current signal.

In other words, the value of the digital current signal is first roughly determined by means of the first and second current values. Next, a fine-tuning of the digital current signal is completed by modulating between first and second current values according to the derived duty cycle value. The digital current signal is converted into the analog driving current.

In a further development, the current sourcing circuit comprises at least one adjustable current source.

The current sourcing circuit can also be realized by using a number n of standard weighted current sources. Each standard weighted current source provides a current of a distinct value. The number n of weighted current sources corresponds to the number n of bits implemented in the current sourcing circuit. As an additional effect, current spikes on an LED driven by the current source are reduced by 2 to the power of n. This reduces the generated electromagnetic radiation and voltage ripple on connected capacitors and possibly audible noise from capacitors.

In one embodiment a driver circuit for light-emitting diodes comprises a voltage converter and at least one current source as described above. The voltage converter has an input for receiving a supply voltage and an output to provide an output voltage. The current source is connected to the output of the voltage converter. The output of the at least one current source forms an output of the driver circuit. This output is configured to be coupled to at least one LED. The at least one LED is driven by the driving current.

The voltage converter converts the supply voltage to the output voltage which is used by the at least one current source to provide the driving current to the at least one LED.

As the average of the driving current provided to the LED can be reduced and the duty cycle of the driving current is boosted by the same amount, the power consumption of the LED is reduced. Still the same luminous intensity of the LED is achieved. Light output is stable even at low current levels.

The current source and driver circuit can be implemented with any kind of LED arrangement, e.g. series, parallel or a combination of both. For example, an array of 6×6 LEDs can also be powered by driver circuit.

In one embodiment a method for providing a driving current comprises the following steps:
  receiving a brightness signal,
  generating a first and a second current value as a function of the brightness signal,
  generating a duty cycle value as a function the brightness signal, and
  providing a driving current as a function of a pulse-width modulation of the first and second current values with the duty cycle value.

In a further embodiment providing the driving current comprises:
  generating a PWM signal as a function of the duty cycle value in a pulse-width modulation,
  generating a digital current signal by multiplexing the first and the second current values as a function of the PWM signal, and
  converting the digital current signal into the driving current.

Figure 2A:
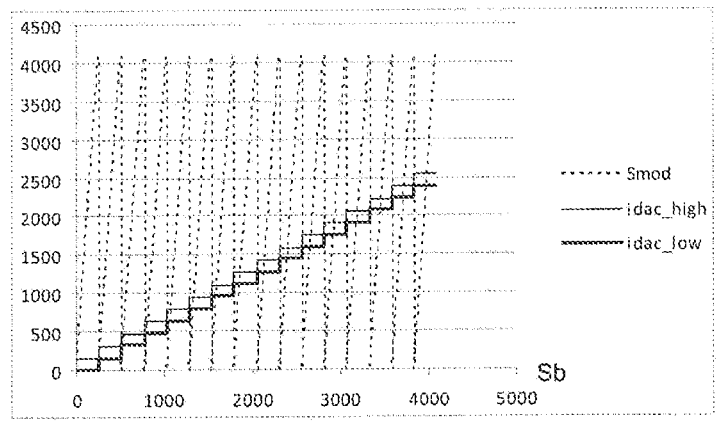
Figure 2B:
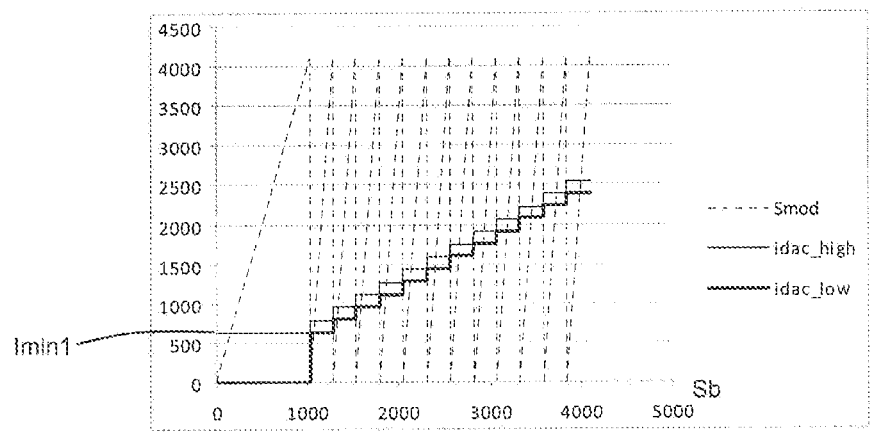
Figure 3:
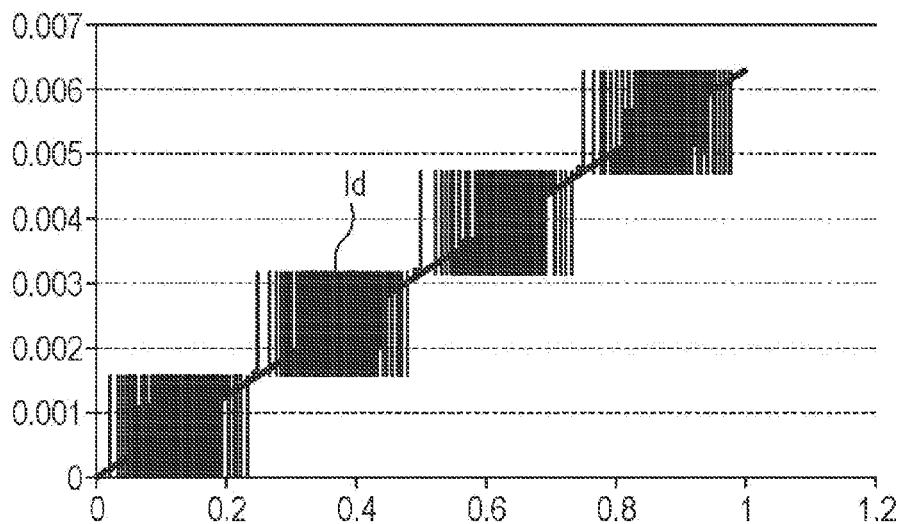
Figure 4A:
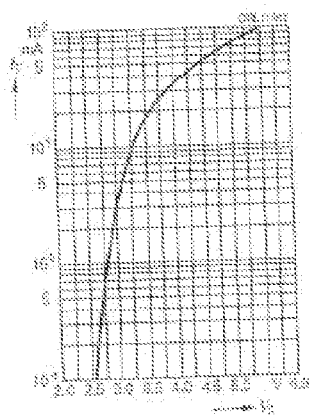
Figure 4B:
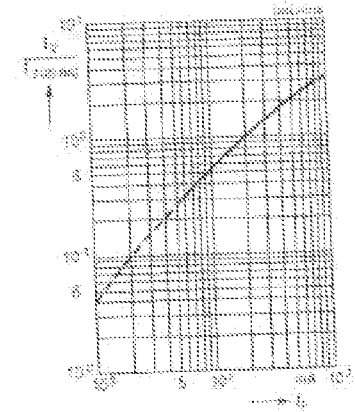
Figure 5:
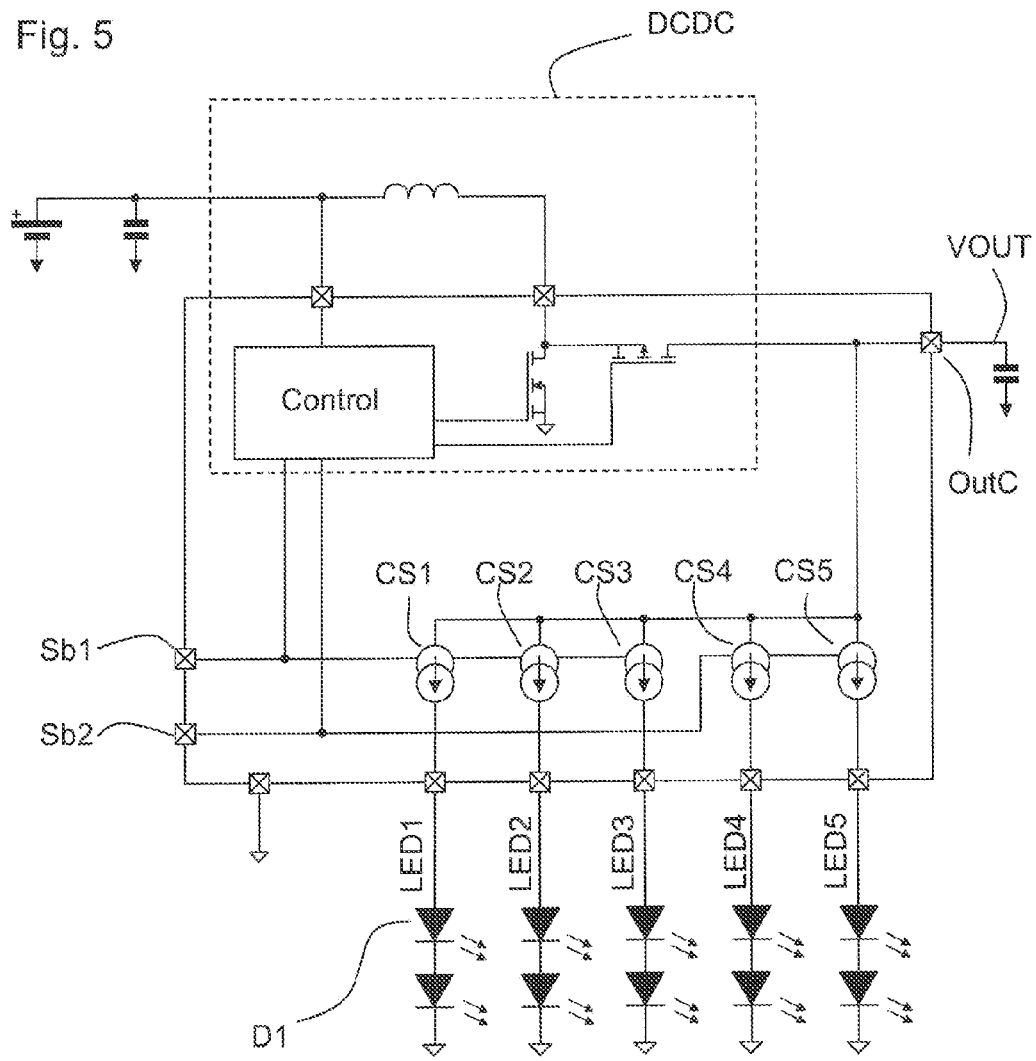

The text below explains the invention in detail using exemplary embodiments with reference to the drawings. Components and circuit elements that are functionally identical or have the identical effect bear identical reference numbers. In so far as circuit parts or components correspond to one another in function, a description of them will not be repeated in each of the following figures. Therein:

FIG. 1 shows an exemplary embodiment of a current source according to the proposed principle, FIGS. 2A and 2B show diagrams corresponding to the embodiment of FIG. 1, FIG. 3 shows another diagram corresponding to the embodiment of FIG. 1, FIGS. 4A and 4B show diagrams of an LED, and FIG. 5 shows an exemplary embodiment of a driver circuit according to the proposed principle.

FIG. 1 shows an exemplary embodiment of a current source according to the proposed principle. The current source CS comprises an input In for receiving a brightness signal Sb and an output Out for providing a driving current Id for at least one light-emitting diode, LED. The current source further comprises a generator circuit Gen, a pulse-width modulation, PWM, circuit, PMC, a multiplexing circuit MUX, and a current sourcing circuit Src. The generator circuit Gen is coupled to the input In and comprises outputs to provide a first and a second current value idac_high, idac_low and a duty cycle value Smod. The PWM circuit PMC is coupled to the generator circuit Gen. The PWM circuit PMC receives the duty cycle value Smod. The PWM circuit PMC comprises an output to provide a PWM signal Spwm as a function of the duty cycle value Smod. The multiplexing circuit MUX is coupled to the generator circuit Gen and to the PWM circuit PMC. The multiplexing circuit MUX comprises an output to provide a digital current signal Si. The current sourcing circuit Src is coupled to the output of the multiplexing circuit MUX. The current sourcing circuit Src is also coupled to the output Out of the current source.

The brightness signal Sb is fed to the input In of the current source CS. The generator circuit Gen splits up the brightness signal Sb into most significant bits and least significant bits. The most significant bits are used for calculating the first and the second current values idac_high, idac_low. From the least significant bits the generator circuit Gen calculates the duty cycle value Smod. In the PMW circuit PMC the duty cycle value Smod is used to generate the PWM signal Spwm by means of a saw-tooth signal and a comparator as well known by a person skilled in the art. The multiplexing circuit MUX switches between the first and the second current values idac_high, idac_low at its inputs in accordance with the PWM signal Spwm. By this, the multiplexing circuit MUX provides the digital current signal Si. The digital current signal Si is converted into the analog driving current Id in the current sourcing unit Src.

As an example for the multiplexing circuit MUX, if the duty cycle value Smod is at 30% or 0.3, the digital current signal Si is provided such that during 30% of the period length of the PWM signal Spwm the digital current signal Si has the value of the first current value idac_high and for the rest of the period, namely 70%, the digital current signal Si takes on the value of the second current value idac_low.

Because of the modulation of the driving current Id with an adjustable duty cycle Smod, the average of the driving current Id can be reduced. This results in a reduction of power consumption with still the same luminous intensity of an LED driven by the current source CS.

FIG. 2A and FIG. 2B each show diagrams corresponding to the embodiment of FIG. 1. In each case, the duty cycle value Smod is represented as a dotted zigzag curve, the first current value idac_high is visualized as a thin full line step function and the second current value idac_low is depicted as a thick full line step function. On the x-axis the values of the brightness signal Sb are depicted. In this example, the brightness signal Sb comprises 12 bits resulting in values starting from 0 to 4095, wherein 0 represents a dark LED and 4095 represents full brightness of the LED. The y-axis shows either the duty cycle value Smod wherein 0 corresponds to 0% and 4095 corresponds to 100% duty cycle. Or the y-axis depicts values of the first and second current values idac_high, idac_low, wherein 0 corresponds to 0 Milliampere and 2550 corresponds to 25.5 Milliampere.

Both figures show that the brightness signal Sb is divided into various segments, each segment being characterized by a special value for the first current value idac_high and another slightly different value for the second current value idac_low. For each segment the duty cycle value Smod takes on a specific value curve for realizing the desired product of duty cycle and driving current as will be explained in more detail below in combination with FIGS. 4A and 4B.

The difference between FIGS. 2A and 2B can be discerned in the range of values for the brightness signal Sb which are below 1000. At very low currents, the luminous intensity of LEDs can vary. Therefore, the first current value idac_high is set to a first minimum value Imin1 for this whole range which avoids operation at very low currents. The duty cycle value Smod is adapted accordingly.

By modulating the driving current Id between first and second current values idac_high, idac_low, high current spikes of the driving current Id are avoided.

FIG. 3 shows another diagram corresponding to the embodiment of FIG. 1. For readability reasons only a small section of FIG. 2A is shown here. On the x-axis values of the duty cycle value Smod are depicted. In this case, the duty cycle value is represented as a factor and not in percent. The black line represents the average value of the driving current Id. The oscillating curve represents values of the driving current Id.

It can be seen that the driving current Id oscillates for each segment of the brightness signal Sb, or for the corresponding segment of the duty cycle value Smod between the first current value idac_high and the second current value idac_low.

FIGS. 4A and 4B show diagrams of an LED. A typical white LED is used as an example. FIG. 4A depicts the current If of an LED, also known as the forward current, in relation to the forward voltage Vf. FIG. 4B presents the relative luminous intensity Iv in relation to the forward current If.

As can be seen, the luminous intensity of the LED is approximately linear between 2 Milliampere and 20 Milliampere. From FIG. 4A it can be discerned that a reduction of the forward current If by a factor of, for example, 10, reduces the forward voltage Vf by approximately 20%. At 20 mA of forward current If the forward voltage is 3.6 Volts. At 2 mA forward current If the forward voltage Vf is at 2.9 V. The power consumption of an LED is calculated according to the following equation:

$$P = D \cdot If \cdot Vf$$

in which P corresponds to the power consumption, D represents the value of the duty cycle, If represents the value of the forward current If and Vf corresponds to the value of the forward voltage Vf.

Regarding the example described above, this means that 20% of power can be saved when driving the LED with a driving current Id corresponding to a forward current If which is reduced by a factor of 10 and increasing the duty cycle by the same amount.

FIG. 5 shows an exemplary embodiment of a driver circuit according to the proposed principle. The driver circuit comprises a voltage converter DCDC with an input for receiving a supply voltage VBat and with an output OutC to provide an output voltage Vout. The driver circuit further comprises at least one current source CS1 according to the proposed principle. In this example, the driver circuit comprises five current sources CS1, CS2, CS3, CS4 and CS5 which all conform to the proposed principle. Each current source CS1 to CS5 is connected to the output OutC of the voltage converter DCDC. An output of each of the current sources CS1 to CS5 forms an output LED1, LED2, LED3, LED4 and LED5 of the driver circuit. To each output LED1, LED2, LED3, LED4 and LED5 at least one light-emitting diode D1 can be connected. Current sources CS1, CS2 and CS3 are controlled by a first brightness signal Sb1. Current sources CS4 and CS5 are controlled by a second brightness signal Sb2. Each of the current sources CS1 to CS5 provides a respective driving current Id1 to Id5 which is modulated according to the invented principle for the respectively connected LEDs.

REFERENCE LIST

Sb, Sb1, Sb2 brightness signal
idac_high, idac_low current value
Smod modulation value
Spwm PWM signal
Si digital current signal
Id, Id1, . . . , Id5 driving current
Gen generator circuit
PMC PWM circuit
MUX multiplexing circuit
Src current sourcing circuit
CS, CS1, . . . , CS5 current source
DCDC voltage converter
VBat supply voltage
In input
Out, OutC, LED1 output
Vout output voltage
D1 light-emitting diode
Imin1 minimum value
LED1, . . . , LED5 output

The invention claimed is:

1. A current source, comprising:
   an input for receiving a brightness signal; and
   an output for providing a driving current for at least one light-emitting diode, (LED),
   wherein the current source is configured
      to extract a first and a second current value from the brightness signal,
      to derive a duty cycle value from the brightness signal and
      to modulate the driving current as a function of the duty cycle value in a pulse-width modulation comprising the first and the second current values.

2. The current source according to claim 1, wherein the brightness signal comprises a digital signal and is configured to control a brightness of the at least one LED.

3. The current source according to claim 1 or 2, wherein the first and second current values are extracted from the brightness signal using a number of most significant bits.

4. The current source according to claim 1, wherein the duty cycle value is generated from the brightness signal using a number of least significant bits, and the duty cycle value represents a value of a duty-cycle of the driving current.

5. The current source according to claim 1, wherein the brightness signal is divided into segments, and wherein for each segment the upper limit represents the first current value and the lower limit represents the second current value, respectively.

6. The current source according to claim 1, wherein the first and the second current values each comprise a digital value, and the first current value is different from the second current value.

7. The current source according to claim 1, wherein the first current value is set to a first minimum value above zero, and wherein the second current value is set to a second minimum value above zero or zero.

8. The current source according to claim 1, further comprising:
   a generator circuit which is coupled to the input and comprises outputs to provide the first and second current values and the duty cycle value;
   a pulse-width modulation, (PWM), circuit which is coupled to the generator circuit and comprises an output to provide a PWM signal as a function of the duty cycle value;
   a multiplexing circuit which is coupled to the generator circuit and to the PWM circuit and comprises an output to provide a digital current signal as a function of the first and second current values and the PWM signal; and a current sourcing circuit which is coupled to the multiplexing circuit and the output and is configured to generate the driving current as a function of the digital current signal.

9. The current source according to claim 8, wherein the current sourcing circuit comprises at least one adjustable current source.

10. A driver circuit for light-emitting diodes, comprising:
a voltage converter with an input for receiving a supply voltage and with an output to provide an output voltage; and
at least one current source according to claim 1, the current source being connected to the output of the voltage converter,
wherein the output of the at least one current source forms an output of the driver circuit and is configured to be coupled to at least one light-emitting diode, the at least one light-emitting diode being driven by the driving current.

11. A method for providing a driving current comprising the following steps:
receiving a brightness signal;
generating a first and a second current value as a function of the brightness signal;
generating a duty cycle value as a function of the brightness signal; and
providing a driving current as a function of a pulse-width modulation of the first and second current values with the duty cycle value.

12. The method according to claim 11, wherein providing the driving current comprises:
generating a PWM signal as a function of the duty cycle value in a pulse-width modulation;
generating a digital current signal by multiplexing the first and second current values as a function of the PWM signal; and
converting the digital current signal into the driving current.

* * * * *